United States Patent Office 3,406,202
Patented Oct. 15, 1968

3,406,202
PREPARATION OF ANILINE THIOETHERS
Walter Reifschneider and Jacqueline S. Kelyman, Midland, Mich., assignors to The Dow Chemical Company, Midland, Mich., a corporation of Delaware
No Drawing. Filed Nov. 12, 1964, Ser. No. 410,706
The portion of the term of the patent subsequent to Sept. 20, 1983, has been disclaimed
8 Claims. (Cl. 260—578)

ABSTRACT OF THE DISCLOSURE

Preparation of aniline thioethers directly by reacting a thiocyanated aniline compound with an alcohol, a lower alkyl sulfate or an organic halide in the presence of a base.

This invention relates to a method for converting aniline compounds into substituted aniline thioethers.

Prior methods for the preparation of aniline thioethers from anilines generally involve many steps and poor overall yields. A primary reason is that the amino group on the benzene ring must be protected during the reaction by acylation or the like, and thereafter the amino group must be regenerated, thus necessitating extra steps in the process with resultant lower yields due to handling losses and the like.

In accordance with this invention a thiocyanated aniline compound is reacted with an alcohol, a lower alkyl sulfate or an organic halogen compound in a suitable solvent, advantageously an alcohol, in the presence of a base to produce the desired aniline thioether directly and in good yields.

The base employed may be an alkali hydroxide, tertiary amine or alkali alkoxide. The base may be employed in alcohol solution, if desired. At least one mole of base per mole of aniline compound is necessary for reaction to take place in good yield. Advantageously from 1–10 moles of base are employed per each mole of aniline compound.

The alcohol or organic halogen compound employed as reactant may be an alkyl, alkenyl, alkynyl, cycloalkyl, haloalkyl, or aralkyl alcohol or halide. Additionally, halides such as acetonyl halide and lower alkyl sulfates having 1 to 4 carbon atoms, e.g. dimethyl or diethyl sulfate may be utilized with advantage. The ratio of thiocyanated aniline to alcoholate should be at least 1:1. When an alkyl halide or sulfate is employed the ratio of reactants should be 1:1 unless no more than one mole of base is present.

The reaction may be carried out at any temperature between about 0° C. and the boiling point of the reaction mixture, i.e. alcohol, sulfate or halide reactant and solvent, if present. The temperature employed is advantageously between 20° C. and the boiling point of the reaction mixture. The reaction time can be from 30 minutes to 200 hours or more, but is advantageously from 2 to 16 hours.

Upon completion of the reaction, the solvent, e.g. excess alcohol, is removed by evaporation, and the residue is taken up in water. If the product separates as a solid, it is collected by filtration and recrystallized from a suitable solvent such as methyl cyclohexane, benzene, Skelly Solvent 60–70, and the like. If the product separates as a gum or oil, the aqueous mixture is extracted with ether or benzene. The organic solution is washed with water and saturated sodium chloride solution and dried over sodium sulfate. After the solvent is removed by evaporation, the residue is either recrystallized from a suitable solvent or distilled under vacuum.

Aniline compounds which may be prepared in accordance with this invention have the general formula:

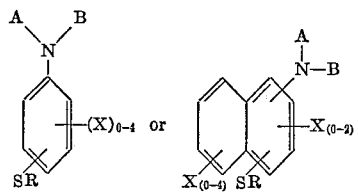

wherein A and B represent hydrogen, alkyl, alkenyl, alkynyl, aryl or acyl, X represents halogen, alkyl, alkenyl, alkynyl, cycloalkyl, aryl, alkoxy, aryloxy, nitro, CN, $CONH_2$, or COOR or any combination of these substituents, and R represents an alkyl, alkenyl, alkynyl, cycloalkyl, haloalkyl, aralkyl or acetonyl group.

The invention will be further understood by reference to the following examples.

Example 1.—2,5-dichloro-4-(methylthio) aniline

To a slurry of 21.9 grams (0.1 mole) 2,5-dichloro-4-(thiocyanato) aniline, 14.2 grams (0.1 mole) methyl iodide, and 100 ml. methanol, 8.0 g. (0.2 mole) of NaOH in 40 ml. of water is added in a slow stream. After the addition is complete, the reaction mixture is allowed to stir at room temperature for fifteen hours. The methanol is removed by evaporation and the residue is taken up in water. The solid which separates is collected by filtration and recrystallized from methylcyclohexane to give 18 grams (87%) of 2,5-dichloro-4-(methylthio) aniline, M.P. 100–101° C.

Analysis.—Calcd. for $C_7H_7Cl_2NS$: C, 40.40; H, 3.40. Found: C, 40.29; H, 3.31.

Similarly, when employing 28 ml. (0.2 mole) of triethylamine, 2,5-dichloro-4-(methylthio) aniline, m. 100–101° C. is obtained.

Example 2.—2,3-dichloro-4-(methylthio) aniline

To a mixture of 65.7 grams (0.3 mole) 2,3-dichloro-4-(thiocyanato) aniline, 42.6 grams (0.3 mole) methyl iodide, and 200 ml. methanol, a solution of 39.6 grams (0.6 mole) 85% potassium hydroxide in 100 ml. water is added in a slow stream over ten minutes. After the addition is complete, the reaction mixture is allowed to stir at room temperature for four hours. The excess methanol is then removed by evaporation, and the aqueous residue is extracted with 3–250 ml. benzene. The benzene extracts are combined, washed with water and saturated sodium chloride solution, and dried over sodium sulfate. After the benzene is removed by evaporation, distillation of the residual oil gives 57 grams (92%) of 2,3-dichloro-4-(methylthio) aniline, b. 137–39° C./0.2 mm., m. 54–55° C.

Analysis.—Calcd. for $C_7H_7Cl_2NS$: C, 40.40; H, 3.40. Found: C, 40.55; H, 3.50.

Example 3.—2-chloro-4-(isopropylthio) aniline

To a solution of 42 grams (0.5 mole) sodium isopropoxide (prepared in situ by the addition of 11.5 grams (0.5 mole) sodium to 500 ml. isopropanol) in 500 ml. isopropanol, 46.2 grams (0.25 mole) 2-chloro-4-(thiocyanato) aniline in 300 ml. isopropanol is added in a slow stream. When the addition is complete, the reaction mixture is heated under reflux for 16 hours. The excess isopropanol is then removed by evaporation, and the residue is taken up in water. The aqueous mixture is extracted with three 200-ml. portions of ether. The ether extracts are combined, washed with water and saturated sodium chloride solution, and dried over sodium sulfate. After the ether is removed by evaporation, vacuum distillation gives Example 4.—2,5-dichloro-4-(methylthio) aniline 32.5 grams (65%) of 2-cholro-4-(isopropylthio) aniline, b. 113°/0.2, RI/25°=1.5991.

*Analysis.*—Calcd. for $C_9H_{12}ClNS$: C, 53.58; H, 5.99. Found: C, 53.43; H, 5.75.

A solution of 17 grams (0.078 mole) 2,5-dichloro-4-(thiocyanato) aniline and 250 ml. methanol is added in a slow stream to 16.6 grams (0.155 mole) triethylamine in 150 ml. methanol. When the addition is complete, the reaction solution is heated under reflux for four hours. The methanol is removed by evaporation, and the residue is taken up in water. The aqueous mixture is extracted with three 250-ml. portions of ether. The ether extracts are combined, washed with saturated sodium chloride solution and dried over sodium sulfate. The ether is removed by evaporation, and the solid residue is recrystallized from methylcyclohexane, to give 8.5 grams (53%) 2,5-dichloro-4-(methylthio) aniline, m. 100–101° C.

*Analysis.*—Calcd. for $C_7H_7Cl_2NS$: C, 40.40; H, 3.40. Found: C, 40.29; H, 3.31.

Example 5.—2,3-dichloro-4-(ethylthio) aniline

A slurry of 43.8 grams (0.2 mole) 2,3-dichloro-4-thiocyanato) aniline in 200 ml. ethanol is added over ten minutes to a slurry of 16 grams (0.4 mole) powdered sodium hydroxide in 200 ml. ethanol. When the addition is complete, the reaction mixture is heated under reflux for two hours. The ethanol is removed by evaporation, and the residue is taken up in water. The aqueous mixture is extracted with 3–200 ml. portions of ether. The ether extracts are combined, washed with saturated sodium chloride solution, and dried over sodium sulfate. The ether is removed by evaporation, and distillation of the residue gave 15 grams (34%) 2,3-dichloro-4-(ethylthio) aniline, b. 134–35°/0.3 mm., RI/25°=1.6367.

Following hte procedure of Examples 3, 4 and 5 the following thioanilines were prepared:

4-(methylthio) aniline B.P. 133/9 mm. RI/25°=1.6383
2-bromo-4-(methylthio) aniline B.P. 120–22/0.5 mm. RI/ 25°=1.6600

*Analysis.*—Calcd: C, 38.54; H, 3.68. Found: C, 38.52; H, 3.44.

3-bromo-4-(methylthio) aniline M.P. 86–87° C.

*Analysis.*—Calcd: C, 38.54; H, 3.68. Found: C, 38.49; H, 3.92.

2-chloro-4-(methylthio) aniline B.P. 109–111/0.3 mm. RI/25°=1.6387

*Analysis.*—Calcd: C, 48.41; H, 4.64. Found: C, 48.48; H, 4.62.

3-chloro-4-(methylthio) aniline M.P. 73.5–74.5° C.

*Analysis.*—Calcd: C, 48.41; H, 4.64. Found: C, 48.29; H, 4.93.

3-chloro-4-(ethylthio) aniline M.P. 51–52° C.

*Analysis.*—Calcd: C, 51.19; H, 5.28. Found: C, 51.13; H, 5.60.

Following the procedure of Examples 1 and 2 the following thioanilines were prepared:

3-fluoro-4-(methylthio) aniline M.P. 48.5–50° C. Yield 83%

*Analysis.*—Calcd: C, 53.48; H, 5.13. Found: C, 53.27; H, 5.04.

2,5-dibromo-4-(methylthio) aniline M.P. 95–97° C. Yield 83%

*Analysis.*—Calcd: C, 28.30; H, 2.38. Found: C, 28.22; H, 2.22.

2,3-dichloro-4-(allylthio) aniline, B.P. 143–46/0.5 mm. RI/25°=1.6446; yield 88%

*Analysis.*—Calcd: C, 46.17; H, 3.88. Found: C, 45.99; H, 3.88.

(Note: Allyl bromide was the organic halide employed.)

3,5-dichloro-4-(methylthio) aniline, M.P. 124–6° C. Yield 84%

*Analysis.*—Calcd: C, 40.40; H, 3.39. Found: C, 40.65; H, 3.38.

We claim:
1. Process for making aniline compounds having the formula

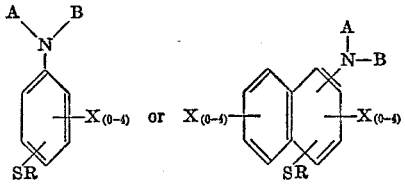

wherein A and B represent hydrogen or alkyl, X represents halogen and R represents an alkyl or alkenyl group which comprises contacting the corresponding compound where R represents the —SCN radical with a lower alkyl sulfate or an alkyl alcohol or halide in the presence of 1–10 moles of an alkali hydroxide, tertiary amine or alkali alkoxide at a temperature between 0° C. and the boiling point of the reaction mixture and the mole ratio of aniline compound to alcohol is at least 1:1 and the mole ratio of aniline compound to alkyl halide or sulfate is 1:1 unless no more than one mole of base is present.

2. Process of claim 1 wherein the aniline compound is 2-chloro-; 2,5-dichloro-; 2,3-dichloro-; 3-bromo-; 3-chloro-; 3-fluoro-; or 2,4-dibromo-4-(thiocyanate) aniline.

3. Process of claim 1 wherein the base is a member of the class consisting of potassium and sodium hydroxides.

4. Process of claim 1 wherein the aniline compound is para-thiocyanatoaniline.

5. Process of claim 1 wherein the alcohol is a lower alkyl alcohol.

6. Process of claim 5 wherein the alcohol is methyl alcohol, ethyl alcohol or isopropyl alcohol.

7. Process of claim 1 wherein the organic halide is employed in conjunction with a lower alkyl alcohol solvent.

8. Process of claim 7 wherein the organic halide is a member of the group consisting of methyl iodide and allyl bromide.

References Cited

UNITED STATES PATENTS

| | | |
|---|---|---|
| 3,129,262 | 4/1964 | Laufer _____ 260—578 |
| 3,274,257 | 9/1966 | Reifschneider et al. ___ 260—609 |
| 3,303,209 | 2/1967 | Reifschneider et al. |
| | | 260—609 XR |

FOREIGN PATENTS 544,849  4/1942  Great Britain.

FLOYD D. HIGEL, *Primary Examiner.*